United States Patent
Lim et al.

(10) Patent No.: US 11,239,499 B2
(45) Date of Patent: Feb. 1, 2022

(54) ADDITIVE, ELECTROLYTE FOR LITHIUM SECONDARY BATTERY AND LITHIUM SECONDARY BATTERY INCLUDING THE SAME

(71) Applicant: Samsung SDI Co., Ltd., Yongin-si (KR)

(72) Inventors: Jinhyeok Lim, Yongin-si (KR); Pavel Shatunov, Yongin-si (KR); Olga Tsay, Yongin-si (KR); Hyejin Park, Yongin-si (KR); Myungheui Woo, Yongin-si (KR); Duckjae You, Yongin-si (KR); Taejin Lee, Yongin-si (KR); Harim Lee, Yongin-si (KR); Wonseok Cho, Yongin-si (KR); Hyunbong Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 228 days.

(21) Appl. No.: 16/705,004

(22) Filed: Dec. 5, 2019

(65) Prior Publication Data
US 2020/0194837 A1 Jun. 18, 2020

(30) Foreign Application Priority Data

Dec. 13, 2018 (KR) .......... 10-2018-0161179
Nov. 13, 2019 (KR) .......... 10-2019-0145398

(51) Int. Cl.
*H01M 10/0567* (2010.01)
*H01M 10/0525* (2010.01)
(Continued)

(52) U.S. Cl.
CPC ....... *H01M 10/0567* (2013.01); *H01M 4/366* (2013.01); *H01M 4/505* (2013.01);
(Continued)

(58) Field of Classification Search
CPC ......... H01M 10/0525; H01M 10/0567; H01M 2300/0028; H01M 2300/004;
(Continued)

(56) References Cited

U.S. PATENT DOCUMENTS 10,128,539 B2 11/2018 Braeunling et al.
2012/0291264 A1 11/2012 Xu et al.
(Continued)

FOREIGN PATENT DOCUMENTS

KR 10-2016-0107262 A 9/2016
KR 10-2017-0073683 A 6/2017
KR 10-2019-0109099 A 9/2019

OTHER PUBLICATIONS

L. Riesel, D. Strum. Reaktion von N-Alkyl-bis(difluorophosphoryl)amiden, RN(POF2)2, rnit silylierten Nukleophilen und Et2NSF3, Z . anorg. allg. Chem. 539 (1986) 187-190.*
(Continued)

*Primary Examiner* — Carlos Barcena
(74) *Attorney, Agent, or Firm* — Lewis Roca Rothgerber Christie LLP

(57) ABSTRACT

An additive for a lithium secondary battery includes a compound represented by Formula 1 below, where $R_1$ to $R_4$ are as defined in the disclosure. An electrolyte for a lithium secondary battery includes: a lithium salt; a non-aqueous organic solvent; and the additive. A lithium secondary battery includes: a cathode; an anode; and the electrolyte.

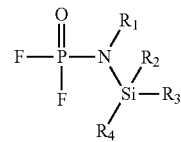

<Formula 1>

10 Claims, 2 Drawing Sheets

(51) Int. Cl.
    *H01M 4/36*     (2006.01)
    *H01M 4/505*     (2010.01)
    *H01M 4/525*     (2010.01)

(52) U.S. Cl.
    CPC ....... *H01M 4/525* (2013.01); *H01M 10/0525* (2013.01); *H01M 2300/0028* (2013.01)

(58) Field of Classification Search
    CPC ...... H01M 4/131; H01M 4/133; H01M 4/366; H01M 4/505; H01M 4/525
    See application file for complete search history.

(56) References Cited

U.S. PATENT DOCUMENTS

| 2017/0288269 A1 | 10/2017 | Moganty et al. |
| 2019/0051941 A1 | 2/2019 | Sawa et al. |
| 2019/0288337 A1 | 9/2019 | Choi et al. |

OTHER PUBLICATIONS

E. A. Robinson, "The Preparation and Raman Spectrum of Diphosphoryl Tetrafluoride: Comparison With the Spectrum of Diphosphoryl Tetrachloride," Canadian Journal of Chemistry, vol. 40, No. 9, Sep. 1962, pp. 1725-1729.

Herbert W. Roesky, et al., "Spaltungsreaktionen an perfluorierten Anhydriden," vol. 25 b, No. 8, Mar. 21, 1970, pp. 773-776.

\* cited by examiner

ADDITIVE, ELECTROLYTE FOR LITHIUM SECONDARY BATTERY AND LITHIUM SECONDARY BATTERY INCLUDING THE SAME

CROSS-REFERENCE TO RELATED APPLICATION

This application claims priority to and the benefit of Korean Patent Application No. 10-2018-0161179, filed on Dec. 13, 2018, and Korean Patent Application No. 10-2019-0145398, filed on Nov. 13, 2019, in the Korean Intellectual Property Office, the entire content of each of which is incorporated herein by reference.

BACKGROUND

1. Field

Embodiments of the present disclosure relate to an additive, an electrolyte for a lithium secondary battery and a lithium secondary battery including the same.

2. Description of Related Art

Lithium secondary batteries are used as power sources for driving portable electronic appliances such as, for example, video cameras, mobile phones, and notebook computers. Rechargeable lithium secondary batteries have three times higher energy density per unit weight than existing lead-acid batteries, nickel-cadmium batteries, nickel metal hydride batteries, and nickel-zinc batteries, and may be charged at high speed.

Because lithium secondary batteries are operated at a high driving voltage, aqueous electrolytes having high reactivity with lithium generally should not be used. As the electrolyte for lithium secondary batteries, an organic electrolyte is generally used. The organic electrolyte is prepared by dissolving a lithium salt in an organic solvent. The organic solvent should be stable at a high voltage, should have high ionic conductivity and a high dielectric constant, and should have low viscosity.

However, when an organic electrolyte including a lithium salt is used as the electrolyte for lithium secondary batteries, the lifetime characteristics and high-temperature stability of a lithium secondary battery may be deteriorated by a side reaction between anode/cathode and an electrolyte.

Accordingly, an electrolyte for lithium secondary batteries, which is capable of providing a lithium secondary battery having improved lifetime characteristics and high-temperature stability, should be provided.

SUMMARY

According to an aspect of an embodiment, there is provided a new additive for a lithium secondary battery.

According to another aspect of an embodiment, there is provided an electrolyte for a lithium secondary battery, including the additive.

According to another aspect of an embodiment, there is provided a lithium secondary battery including the electrolyte.

Additional aspects of embodiments will be set forth in part in the description which follows and, in part, will be apparent from the description, or may be learned by practice of the presented embodiments of the disclosure.

According to an aspect of an embodiment of the present disclosure, there is provided an additive for a lithium secondary battery, including a compound represented by Formula 1 below:

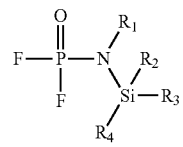

Formula 1

In Formula 1 above, $R_1$ to $R_4$ may each independently be a substituted or unsubstituted $C_1$-$C_{30}$ alkyl group or a substituted or unsubstituted $C_2$-$C_{30}$ alkenyl group, and a substituent of the substituted $C_1$-$C_{30}$ alkyl group or the substituted $C_2$-$C_{30}$ alkenyl group may include at least one selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group.

According to another aspect of an embodiment of the present disclosure, there is provided an electrolyte for a lithium secondary battery, including: a lithium salt;

non-aqueous organic solvent; and the additive.

According to another aspect of an embodiment of the present disclosure, there is provided a lithium secondary battery, including: a cathode;

anode; and the electrolyte for a lithium secondary battery.

BRIEF DESCRIPTION OF THE DRAWINGS

The above, and other aspects and features, of certain embodiments of the disclosure will be more apparent from the following description taken in conjunction with the accompanying drawings, in which.

DETAILED DESCRIPTION

Figure 1:
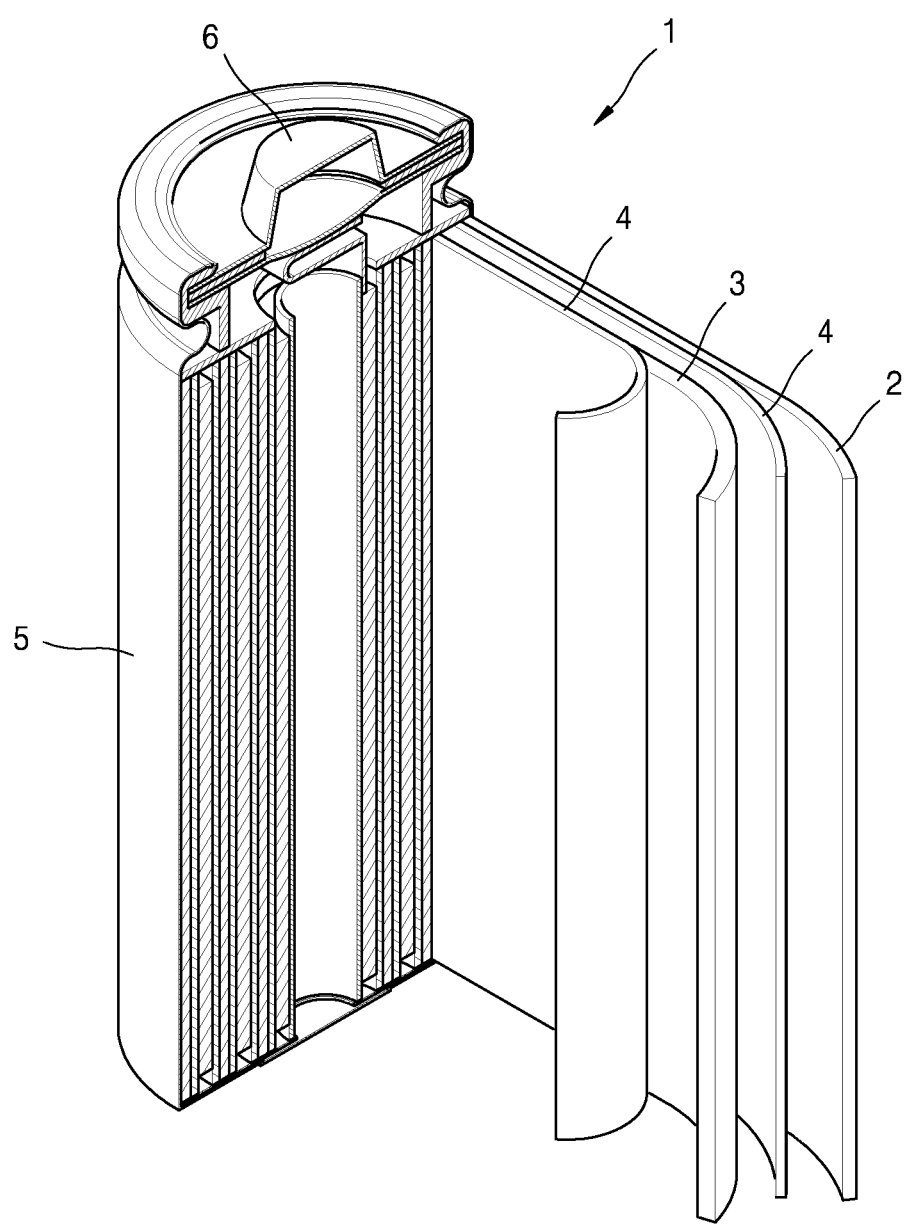
FIG. 1 is a schematic view of a lithium secondary battery according to an embodiment.

Reference will now be made in more detail to embodiments of the present disclosure, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, an additive for lithium secondary batteries, an organic electrolyte including the additive, and a lithium secondary battery employing the electrolyte according to embodiments will be described in more detail.

As used herein, "a" and "b" in "$C_a$-$C_b$" refer to the number of carbon atoms in a functional group. For example, the functional group may include "a" to "b" carbon atoms. Therefore, for example, the term "$C_1$-$C_4$ alkyl group," as used herein, refers to an alkyl group having 1 to 4 carbon atoms, such as $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, or $(CH_3)_3C$—.

Certain radical nomenclature used herein may include mono-radicals or di-radicals depending on the context. For example, when one substituent requires two connection points in the remaining molecule, it is to be understood that the substituent is a di-radical. For example, a substituent recognized as an alkyl group having two connecting points includes a di-radical such as —$CH_2$—, —$CH_2CH_2$—, or —$CH_2CH(CH_3)CH_2$—. Other radical nomenclature used herein may clearly indicate that the radical is a di-radical such as "alkylene" or "alkenylene".

As used herein, the term "alkyl group" refers to a branched or unbranched aliphatic hydrocarbon group. In an embodiment, an alkyl group may be substituted or unsubstituted. Examples of the alkyl group may include, but are not limited to, a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group. In some embodiments, each of these alkyl groups may be selectively substituted. In some embodiments, the alkyl group may include 1 to 6 carbon atoms. Examples of the alkyl group having 1 to 6 carbon atoms may include, but are not limited to, a methyl group, an ethyl group, a propyl group, an iso-propyl group, a butyl group, an iso-butyl group, a sec-butyl group, a pentyl group, a 3-pentyl group, and a hexyl group.

As used herein, the term "alkenyl group" refers to a hydrocarbon group having 2 to 20 carbon atoms including at least one carbon-carbon double bond, and examples thereof include, but are not limited to, an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexenyl group, and a cycloheptenyl group. In some embodiments, an alkenyl group may be substituted or unsubstituted. In some embodiments, the number of carbon atoms in the alkenyl group may be 2 to 40.

As used herein, the term "alkynyl group" refers to a hydrocarbon group having 2 to 20 carbon atoms including at least one carbon-carbon triple bond, and examples thereof include, but are not limited to, an ethynyl group, a 1-propynyl group, a 2-propynyl group, a 1-butynyl group, and a 2-butynyl group. In some embodiments, the alkynyl group may be substituted or unsubstituted. In some embodiments, the number of carbon atoms in the alkynyl group may be 2 to 40.

As used herein, a substituent may be derived from an unsubstituted parent group. Here, at least one hydrogen atom may be substituted with another atom or a functional group. Unless otherwise expressed, when a functional group is referred to as "substituted", it means that the functional group is substituted with at least one substituent selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group. When it is described herein that one functional group is "selectively substituted", the functional group may be substituted with any one of the aforementioned substituents.

An additive for a lithium secondary battery according to an embodiment includes a compound represented by Formula 1 below:

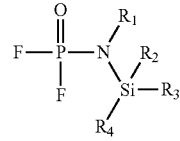

Formula 1

In Formula 1 above, $R_1$ to $R_4$ may each independently be a substituted or unsubstituted $C_1$-$C_{30}$ alkyl group or a substituted or unsubstituted $C_2$-$C_{30}$ alkenyl group, and a substituent of the substituted $C_1$-$C_{30}$ alkyl group or the $C_2$-$C_{30}$ alkenyl group may be at least one selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group.

When the additive including the compound represented by Formula 1 is added to an electrolyte for a lithium secondary battery, the lifetime characteristics and high-temperature stability of the lithium secondary battery may be improved.

In an embodiment, in Formula 1, $R_1$ to $R_4$ may each independently be a $C_1$-$C_{30}$ alkyl group, or a $C_1$-$C_{30}$ alkyl group substituted with at least one selected from a methyl group, an ethyl group, a propyl group, a butyl group, —F, —Cl, —Br, —I, a cyano group, a hydroxy group, and a nitro group.

For example, in Formula 1, $R_1$ may be a $C_1$-$C_{30}$ alkyl group.

For example, in Formula 1, $R_1$ may be a substituted or unsubstituted $C_1$-$C_{30}$ alkyl group.

In an embodiment, the compound represented by Formula 1 may be Compound 1 below.

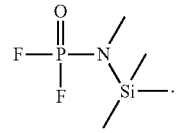

Compound 1

According to embodiments of the present disclosure, the compound is added to an electrolyte to improve the performance of a lithium secondary battery, as described in more detail herein below. The present disclosure, however, is not limited to any particular mechanism or theory and this discussion is to aid the understanding of the subject matter of the present disclosure, and the scope of the present disclosure is not limited to the following description.

Because the compound represented by Formula 1 herein above includes a nitrogen and a difluorophosphate (—$OPF_2$) group having excellent electrical and chemical reactivity at an end thereof, the decomposition of an organic solvent such as ethylene carbonate (EC) may be suppressed or reduced to reduce the subsequent generation of gas, and thus, a resistance increase rate of lithium secondary battery including an electrolyte including the additive may be lowered.

Further, although $LiPF_6$ may be used as the lithium salt included in an electrolyte, $LiPF_6$ may have unsuitable or insufficient thermal stability and may be easily hydrolyzed even by water. However, when the additive including the compound represented by Formula 1 is added to an electrolyte, $PF_5^-$ ions generated by the decomposition of water ($H_2O$) molecules and $LiPF_6$ may be captured by a difluorophosphate ($—OPF_2$) group, which is a functional group of the compound represented by Formula 1, and nitrogen, thereby suppressing or reducing the hydrolysis reaction of $LiPF_6$ by moisture. As a result, the generation of gas in the lithium secondary battery may be suppressed or reduced to thereby improve cycle lifetime characteristics. Further, the swelling phenomenon of a battery may be prevented or reduced due to the suppression or reduction of gas generation.

In addition, a $—PF_2$ group located at the end of the compound represented by Formula 1 may form a stable thin film on the surface of a metal substrate through a complexing reaction with metal ions, for example, copper ions ($Cu^{2+}$) eluted from the metal substrate. Due to the formation of such a thin film, the additional elution of metal from the metal substrate may be suppressed or reduced, and thus, the overdischarging of a battery during the storage of the battery may be suppressed or reduced to thereby improve battery characteristics.

During the initial charging of the lithium secondary battery, the decomposition reaction of an electrolyte may occur on the surface of an anode as a result of the reduction potential of the electrolyte being relatively higher than that of lithium. The decomposition reaction of an electrolyte may form a solid electrolyte interphase (SEI) on the surface of an electrode to suppress or reduce the movement of electrons required for a reaction between an anode and an electrolyte, thereby preventing or reducing the additional decomposition of the electrolyte. Thus, the performance of a battery may depend on the characteristics of a film formed on the surface of an anode. Considering this, an SEI layer that is more rigid and has excellent electrical characteristics should be formed through the introduction of an electrolyte additive that is decomposed before the electrolyte during a charging reaction.

The additive for an electrolyte of a lithium secondary battery, represented by Formula 1, according to an embodiment may include a $—OPF_2$ group having excellent electrochemical reactivity at one end thereof, and thus, the additive may be decomposed before the electrolyte during a charging reaction, thereby forming an SEI film that is rigid and has excellent electrical characteristics on the surface of an anode.

Further, the additive for an electrolyte of a lithium secondary battery, represented by Formula 1, according to an embodiment may include a silyl group at the other end thereof, and thus, an SEI film having high silyl group concentration may be formed, thereby forming a chemically stable film having high polarity. Accordingly, the resistance at the interface between an electrolyte and an anode may be lowered to improve the conductivity of lithium ions, and thus, there is an effect of increasing a low-temperature discharge voltage.

Further, because the $—OPF_2$ group has excellent electrochemical reactivity, the $—OPF_2$ group may form a donor-acceptor bond with a transition metal oxide exposed to the surface of a cathode active material, and thus, a protective layer may be formed in the form of a composite.

Further, because the $—OPF_2$ group attached to a transition metal oxide may be oxidized to a plurality of difluorophosphates during the initial charging of the lithium secondary battery, consequently, an inactive layer that is more stable and excellent in ion conductivity may be formed on a cathode. Accordingly, it is possible to prevent or reduce oxidative decomposition of other components of the electrolyte, and consequently, it is possible to improve the cycle lifetime performance of the lithium secondary battery and prevent or reduce the occurrence of a swelling phenomenon.

An electrolyte for a lithium secondary battery according to an embodiment may include: a lithium salt; a non-aqueous organic solvent; and the additive.

For example, the content (e.g., an amount or weight) of the additive may be in a range of about 0.1 wt % to about 10 wt % based on the total weight of the electrolyte, but the present disclosure is not limited thereto. The content (e.g., an amount or weight) thereof may be suitably or appropriately selected within the range that does not deteriorate (or does not substantially deteriorate) the characteristics of a battery. For example, the content (e.g., an amount or weight) of the additive may be in a range of about 0.1 wt % to about 5 wt % based on the total weight of the electrolyte.

When the content (e.g., an amount or weight) of the additive exceeds the above content range, for example, exceeds 10 wt % based on the total weight of the electrolyte, battery life may deteriorate.

In an embodiment, the electrolyte for a lithium secondary battery may further include an aliphatic nitrile compound. For example, the aliphatic nitrile compound may include, but is not limited to, acetonitrile (AN) or succinonitrile (SN). Any suitable aliphatic nitrile compound may be used provided that an end of a hydrocarbon group of the aliphatic nitrile compound contains a nitrile group.

For example, the content (e.g., an amount or weight) of the aliphatic nitrile compound may be in a range of about 0.1 wt % to about 10 wt % based on the total weight of the electrolyte, but the present disclosure is not limited thereto. The content (e.g., an amount or weight) thereof may be suitably or appropriately selected within the range that does not inhibit (e.g., does not substantially inhibit) the effect of suppressing or reducing the elution of metal.

In an embodiment, the lithium salt may include at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ ($0 \leq x \leq 20$, $0 \leq y \leq 20$), LiCl, LiI, lithium bis(oxalate) borate (LiBOB), and $LiPO_2F_2$, but the present disclosure is not limited thereto. For example, the lithium salt may include lithium bis(fluorosulfonyl) imide ($LiN(FSO_2)_2$). Any suitable lithium salt generally used in the art may be used.

The concentration of the lithium salt in the electrolyte may be in a range of about 0.01 M to about 2.0 M, but the present disclosure is not limited to this range. Any suitable or appropriate concentration may be used as needed or desired. Within the above concentration range, further improved battery characteristics may be obtained.

In an embodiment, the non-aqueous organic solvent may include at least one selected from ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinylethylene carbonate (VEC), butylene carbonate, ethyl propionate, ethyl butyrate, dimethyl sulfoxide, dimethyl formamide, dimethylacetamide, gamma-valerolactone, gamma-butyrolactone, and tetrahydrofuran, but the present disclosure is not limited thereto. Any suitable organic solvent generally used in the art may be used.

The electrolyte may be in a liquid or gel state. The electrolyte may be prepared by adding the lithium salt and the additive to the non-aqueous organic solvent.

A lithium secondary battery according to another embodiment includes a cathode; an anode; and the electrolyte. The form of the lithium battery is not particularly limited, and may include a lithium secondary battery such as a lithium ion battery, a lithium ion polymer battery, and a lithium sulfur battery, as well as a lithium primary battery.

The operating voltage of the lithium secondary battery may be 4.2 V or more, for example, 4.3 V or more, or, for example, 4.45 V or more.

For example, the lithium secondary battery may be manufactured by the following method, but the present disclosure is not limited thereto.

First, a cathode is prepared.

For example, a cathode active material composition in which a cathode active material, a conductive material, a binder, and a solvent are mixed is prepared. A cathode plate is prepared by coating a cathode current collector with the cathode active material composition. In some embodiments, the cathode plate may be prepared by casting the cathode active material composition onto a separate support, separating a film from the support and then laminating the separated film on a metal current collector. The cathode is not limited to the above-described form, but may have a form other than the above-described form.

The cathode active material, which is a lithium-containing metal oxide, may be used without limitation, and may be any suitable cathode active material generally used in the art. As the lithium-containing metal oxide, for example, two or more kinds of composite oxides of lithium and a metal selected from cobalt, manganese, nickel, and combinations thereof may be used. For example, as cathode active material, a compound represented by any one of Formulae of $Li_aA_{1-b}B^1_bD^1_2$ (where, $0.90 \le a \le 1.8$ and $0 \le b \le 0.5$ are satisfied); $Li_aE_{1-b}B^1_bO_{2-c}D^1_c$ (where, $0.90 \le a \le 1.8$, $0 \le b \le 0.5$, and $0 \le c \le 0.05$ are satisfied); $LiE_{2-b}B^1_bO_{4-c}D^1_c$ (where, $0 \le b \le 0.5$ and $0 \le c \le 0.05$ are satisfied); $Li_aNi_{1-b-c}Co_bB^1_cD^1_\alpha$ (where, $0.90 \le a \le 1.8$, $0 \le b \le 0.5$, $0 \le c \le 0.05$, and $0 < \alpha 2$ are satisfied); $Li_aNi_{1-b-c}Co_bB^1_cO_{2-\alpha}F^1_\alpha$ (where, $0.90 \le a \le 1.8$, $0 \le b \le 0.5$, $0 \le c \le 0.05$, and $0 < \alpha < 2$ are satisfied); $Li_aNi_{1-b-c}Co_bB^1_cO_{2-\alpha}F^1_\alpha$ (where, $0.90 \le a \le 1.8$, $0 \le b \le 0.5$, $0 \le c \le 0.05$, and $0 < \alpha < 2$ are satisfied); $Li_aNi_{1-b-c}Mn_bB^1_cD^1_\alpha$ (where, $0.90 \le a \le 1.8$, $0 \le b \le 0.5$, $0 \le c \le 0.05$, and $0 < \alpha 2$ are satisfied); $Li_aNi_{1-b-c}Mn_bB^1_cO_{2-\alpha}F^1_\alpha$ (where, $0.90 \le a \le 1.8$, $0 \le b \le 0.5$, $0 \le c \le 0.05$, and $0 < \alpha < 2$ are satisfied); $Li_aNi_{1-b-c}Mn_bB^1_cO_{2-\alpha}F^1_2$ (where, $0.90 \le a \le 1.8$, $0 \le b \le 0.5$, $0 \le c \le 0.05$, and $0 < \alpha < 2$ are satisfied); $Li_aNi_bE_cG_dO_2$ (where, $0.90 \le a \le 1.8$, $0 \le b \le 0.9$, $0 \le c \le 0.5$, and $0.001 \le d \le 0.1$ are satisfied); $Li_aNi_bCo_cMn_dG_eO_2$ (where, $0.90 \le a \le 1.8$, $0 \le b \le 0.9$, $0 \le c \le 0.5$, $0 \le d \le 0.5$, and $0.001 \le e \le 0.1$ are satisfied); $Li_aNiG_bO_2$ (where, $0.90 \le a \le 1.8$ and $0.001 \le b \le 0.1$ are satisfied); $Li_aCoG_bO_2$ (where, $0.90 \le a \le 1.8$ and $0.001 \le b \le 0.1$ are satisfied); $Li_aMnG_bO_2$ (where, $0.90 \le a \le 1.8$ and $0.001 \le b \le 0.1$ are satisfied); $Li_aMn_2G_bO_4$ (where, $0.90 \le a \le 1.8$ and $0.001 \le b \le 0.1$ are satisfied); $QO_2$; $QS_2$; $LiQS_2$; $V_2O_5$; $LiV_2O_5$; $LiI^1O_2$; $LiNiVO_4$; $Li_{(3-f)}J_2(PO_4)_3 (0 \le f \le 2)$; $Li_{(3-f)}Fe_2(PO_4)_3 (0 \le f \le 2)$; and $LiFePO_4$ may be used.

In the formulae above, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the lithium-containing metal oxide may be $LiCoO_2$, $LiMn_gI_{2g}$ (g=1, 2), $LiNi_{1-g}Mn_gO_{2g}$ (0<g<1), $LiNi_{1-g-k}Co_gMn_kO_2$ ($0 \le g \le 0.5$, $0 \le k \le 0.5$), or $LiFePO_4$.

In some embodiments, the cathode may include a cathode active material having a layered structure.

For example, the cathode active material may be represented by Formula 3 below:

Formula 3 in Formula 3, M' is at least one selected from Co, Mn, Al, Cu, Fe, Mg, Cr, Zn, B, and Ga, and $0 < s \le 0.99$ is satisfied.

For example, the cathode active material may be represented by Formula 4 below:

Formula 4 in Formula 4, M" is Mn or Al, $0.96 \le t \le 1.05$, $0 < u \le 0.5$, and $0 < v \le 0.5$) are satisfied. For example, in Formula 4, $0.01 \le u \le 0.35$ may be satisfied. For example, in Formula 4, $0.01 \le v \le 0.35$ may be satisfied.

For example, the cathode active material may be $LiNi_{1/3}Co_{1/3}Mn_{1/3}O_2$, $LiNi_{1/3}Co_{1/3}Al_{1/3}O_2$, $LiNi_{0.6}Co_{0.2}Mn_{0.2}O_2$, $LiNi_{0.6}Co_{0.2}Al_{0.2}O_2$, $LiNi_{0.8}Co_{0.1}Mn_{0.1}O_2$, or $LiNi_{0.8}Co_{0.1}Al_{0.1}O_2$, but the present disclosure is not limited thereto.

In one or more embodiments, a compound having a coating layer on the surface of the compound may be used, or a mixture of the compound and a compound having a coating layer may be used. The coating layer may include a coating element compound of an oxide of the coating element, a hydroxide of the coating element, an oxyhydroxide of the coating element, an oxycarbonate of the coating element, or a hydroxycarbonate of the coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, any suitable coating method generally used in the art may be used provided that the method does not adversely affect the properties (e.g., physical and/or chemical properties) of the cathode active material (for example, spray coating, dipping or the like). Such a coating method should be readily apparent to those skilled in the art upon review of the present disclosure, such that a detailed description is not necessary here.

The conductive material may be carbon black or graphite particles, but the present disclosure is not limited thereto. Any suitable conductive material generally used in the art may be used.

Examples of the binder may include, but are not limited to, a vinylidene fluoride/hexafluoropropylene copolymer, polyvinylidene fluoride (PVDF), polyacrylonitrile, polymethylmethacrylate, polytetrafluoroethylene and mixtures thereof, and a styrene butadiene rubber-based polymer. Any suitable binder generally used in the art may be used.

As the solvent, N-methylpyrrolidone, acetone, water, or the like may be used, but the present disclosure is not limited thereto. Any suitable solvent generally used in the art may be used.

The content (e.g., an amount or weight) of the cathode active material, the content (e.g., an amount or weight) of the conductive material, the content (e.g., an amount or weight) of the binder, and the content (e.g., an amount or weight) of the solvent may be any suitable level generally used in the art. At least one of the conductive material, the binder, and the solvent may be omitted depending on the use and configuration of the lithium secondary battery.

Next, an anode is prepared.

For example, an anode active material composition in which an anode active material, a conductive material, a binder, and a solvent are mixed is prepared. An anode plate is prepared by directly coating an anode current collector with the anode active material composition and drying the anode active material composition. In some embodiments, the anode plate may be prepared by casting the anode active material composition onto a separate support, separating a film from the support and then laminating the separated film on a metal current collector.

The anode active material may be used without limitation. Any suitable anode active material generally used in the art may be used. For example, the anode active material may include at least one selected from a lithium metal, a metal alloyable with lithium, a transition metal oxide, a non-transition metal oxide, and a carbon-based material.

For example, the metal alloyable with lithium may be Si, Sn, Al, Ge, Pb, Bi, Sb, a Si—Y alloy (Y is an alkaline metal, an alkaline earth metal, a group 13 element, a group 14 element, a transition metal, or a combination thereof, and not Si), or a Sn—Y alloy (Y is an alkaline metal, an alkaline earth metal, a group 13 element, a group 14 element, a transition metal, or a combination thereof, and not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

For example, the transition metal oxide may be lithium titanium oxide, vanadium oxide, lithium vanadium oxide, or the like.

For example, the non-transition metal oxide may be $SnO_2$, $SiO_x$ ($0<x<2$), or the like.

The carbon-based material may be crystalline carbon, amorphous carbon, or a mixture thereof. The crystalline carbon may be graphite such as natural graphite or artificial graphite having an amorphous, plate-like, flake-like, spherical or fibrous form. The amorphous carbon may be soft carbon (low-temperature fired carbon), hard carbon, mesophase pitch carbide, or fired coke.

The conductive material, binder and solvent in the anode active material composition may be the same as those in the cathode active material composition.

The content (e.g., an amount or weight) of the anode active material, the content (e.g., an amount or weight) of the conductive material, the content (e.g., an amount or weight) of the binder, and the content (e.g., an amount or weight) of the solvent may be any suitable level generally used in the art. At least one of the conductive material, the binder, and the solvent may be omitted depending on the use and configuration of the lithium secondary battery.

Next, a separator to be inserted between the anode and the cathode is prepared.

As the separator, any suitable separator generally used in the art may be used. A separator having low resistance to the movement of ions in the electrolyte and superior in electrolyte wettability may be used. For example, the separator may include any one selected from glass fiber, polyester, polyethylene, polypropylene, polytetrafluoroethylene (PTFE), and combinations thereof, and may be made in the form of nonwoven fabric or woven fabric. For example, a windable separator including polyethylene, polypropylene, or the like may be used in a lithium ion battery, and a separator having good electrolyte impregnation ability may be used in a lithium ion polymer battery. For example, the separator may be produced by the following method.

A polymer resin, a filler, and a solvent are mixed to prepare a separator composition. The separator composition is directly applied on an electrode and dried to form a separator. In some embodiments, the separator composition is cast on a support and dried, a separation film is separated from the support, and then the separation film is laminated on the electrode to form a separator.

The polymer resin used in the production of the separator is not limited, and any suitable material generally used in the art for a binder of an electrode plate may be used in the production of the separator. For example, as the polymer resin, a vinylidene fluoride/hexafluoropropylene copolymer, polyvinylidene fluoride (PVDF), polyacrylonitrile, polymethyl methacrylate, or a mixture thereof may be used.

Next, the above-described electrolyte for a lithium secondary battery is prepared.

As shown in FIG. 1, the lithium secondary battery 1 includes a cathode 3, an anode 2, and a separator 4. The anode 2, the cathode 3, and the separator 4 are wound or folded and accommodated in a battery case 5. Then, an electrolyte is injected into the battery case 5, and the battery case 5 is sealed with a cap assembly 6 to complete the manufacture of the lithium secondary battery 1. The battery case 5 may have a cylindrical shape, a rectangular shape, or a thin film shape, but the present disclosure is not limited thereto. For example, the lithium secondary battery 1 may be a large-sized thin-film battery. The lithium secondary battery 1 may be a lithium ion battery.

The separator 4 may be located between the anode 2 and the cathode 3 to form a battery structure. The battery structure is laminated as a bi-cell structure and then impregnated with an electrolyte, and the resulting product is accommodated in a pouch and sealed to complete a lithium ion polymer battery.

Further, the plurality of battery structures may be laminated to form a battery pack, and this battery pack may be used in any suitable appliances utilizing high capacity and high power. For example, the battery pack may be used in notebooks, smart phones, electric vehicles, and the like.

Further, because the lithium secondary battery is excellent in lifetime characteristics and high rate characteristics, it may be used in electric vehicles (EV). For example, the lithium secondary battery may be used in hybrid vehicles such as plug-in hybrid electric vehicles. Further, the lithium secondary battery may be used in fields requiring a large amount of electric power storage. For example, the lithium secondary battery may be used in electric bicycles, electric tools, and/or the like.

Hereinafter, embodiments of the present disclosure will be described in more detail with reference to Examples and Comparative Examples. However, these Examples are for illustrating embodiments of the present disclosure, and the scope of the present disclosure is not limited thereto.

Synthesis Example 1

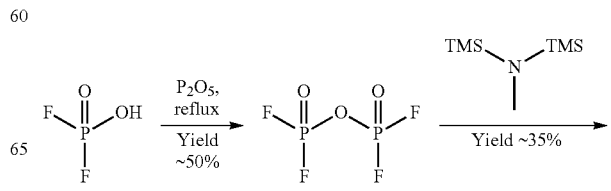

-continued

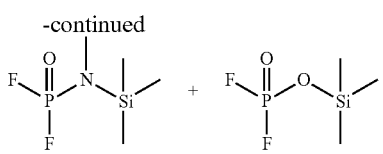

Difluorophosphoric acid (0.5 mole) and P$_2$O$_5$ (0.1 mole) were heated under gentle reflux for 1 hour and the mixture was distilled. The fraction boiling below 75° C. was collected and purified by fractional distillation using 20 cm column under atmospheric pressure. Yield: ~50% B.P. 71° C. $^{31}$P NMR (, CDCl$_3$): −38.61 ppm (t, J=1067 Hz). $^{19}$F NMR (, CDCl$_3$). δ: −78.02 ppm (d, J=1066 Hz).

Diphosphoryl tetrafluoride (27.88 g, 0.15 mol) was added dropwise at 0° C. to a stirred solution of heptamethyldisilazane (24.56 g, 0.14 mol) in dry methylene chloride (10 ml). The reaction mixture was stirred at room temperature for 2 hours and then distilled using 20 cm column under vacuum. Yield 9.2 g (~35%). B.P. 51.5-52° C. (12 Torr). $^1$H NMR, δ: 0.29 (s, 9H, SiMe$_3$); 2.72 (d, 3H, NCH$_3$). $^{31}$P NMR (, CDCl$_3$) δ: −1.99 ppm (t, J=1010 Hz). $^{19}$F NMR (, CDCl$_3$) δ: −75.53 ppm (d, J=1010 Hz).

Preparation of Electrolyte

Preparation Example 1

1.5 M LiPF$_6$ was added to a first mixed solution in which ethylene carbonate (EC), ethyl methyl carbonate (EMC), and dimethyl carbonate (DMC) were mixed to a volume ratio of 2:1:7, to prepare a second mixed solution.

0.1 wt % of Compound 1 below was added to the second mixed solution to prepare an electrolyte for a lithium secondary battery, based on the total weight of the electrolyte.

Compound 1

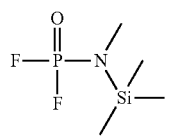

Preparation Example 2

An electrolyte for a lithium secondary battery was prepared in substantially the same manner as in Preparation Example 1, except that 0.2 wt % of Compound 1 was added, based on the total weight of the electrolyte.

Preparation Example 3

An electrolyte for a lithium secondary battery was prepared in substantially the same manner as in Preparation Example 1, except that 0.5 wt % of Compound 1 was added, based on the total weight of the electrolyte.

Preparation Example 4

An electrolyte for a lithium secondary battery was prepared in substantially the same manner as in Preparation Example 1, except that 1 wt % of Compound 1 was added, based on the total weight of the electrolyte.

Preparation Example 5

An electrolyte for a lithium secondary battery was prepared in substantially the same manner as in Preparation Example 1, except that 2 wt % of Compound 1 was added, based on the total weight of the electrolyte.

Preparation Example 6

An electrolyte for a lithium secondary battery was prepared in substantially the same manner as in Preparation Example 1, except that 5 wt % of Compound 1 was added, based on the total weight of the electrolyte.

Comparative Preparation Example 1

An electrolyte for a lithium secondary battery was prepared in substantially the same manner as in Preparation Example 1, except that Compound 1 was not added.

Manufacture of Lithium Secondary Battery

Example 1

87 wt % of graphite, 11 wt % of SCN, 1 wt % of a styrene-butadiene rubber (SBR) binder (ZEON), and 1.0 wt % of carboxymethyl cellulose (CMC, manufactured by NIPPON A&L) were mixed, introduced into distilled water, and then stirred for 60 minutes using a mechanical stirrer to prepare an anode active material slurry. The slurry was applied onto a copper current collector having a thickness of 10 μm to a thickness of about 60 μm using a doctor blade, dried at 100° C. for 0.5 hours using a hot air dryer, further dried in vacuum at 120° C. for 4 hours, and then roll-pressed to prepare an anode plate.

Preparation of Cathode 97 wt % of LiNi$_{0.8}$Co$_{0.1}$Al$_{0.1}$O$_2$ (NCA), 0.5 wt % of artificial graphite (SFG6, Timcal) powder, 0.8 wt % of carbon black (Ketjenblack, ECP), 0.2 wt % of modified acrylonitrile rubber (BM-720H, manufactured by Zeon Corporation), 1.2 wt % of polyvinylidene fluoride (PVDF, S6020, Solvay), and 0.3 wt % of polyvinylidene fluoride (PVDF, S5130, Solvay) were mixed, introduced into an N-methyl-2-pyrrolidone solvent, and then stirred for 30 minutes using a mechanical stirrer to prepare a cathode active material slurry. The slurry was applied onto an aluminum current collector having a thickness of 20 μm to a thickness of about 60 μm using a doctor blade, dried at 100° C. for 0.5 hours using a hot air dryer, further dried in vacuum at 120° C. for 4 hours, and then roll-pressed to prepare a cathode plate.

A lithium secondary battery was manufactured by using a polyethylene separator having a thickness of 14 μm and coated with ceramic on a side facing the anode and using the electrolyte prepared in Preparation Example 1.

Example 2

A lithium secondary battery was manufactured in substantially the same manner as in Example 1, except that the electrolyte prepared in Preparation Example 2 was used instead of the electrolyte prepared in Preparation Example 1.

Example 3

A lithium secondary battery was manufactured in substantially the same manner as in Example 1, except that the electrolyte prepared in Preparation Example 3 was used instead of the electrolyte prepared in Preparation Example 1.

Example 4

A lithium secondary battery was manufactured in substantially the same manner as in Example 1, except that the electrolyte prepared in Preparation Example 4 was used instead of the electrolyte prepared in Preparation Example 1.

Example 5

A lithium secondary battery was manufactured in substantially the same manner as in Example 1, except that the electrolyte prepared in Preparation Example 5 was used instead of the electrolyte prepared in Preparation Example 1.

Example 6

A lithium secondary battery was manufactured in substantially the same manner as in Example 1, except that the electrolyte prepared in Preparation Example 6 was used instead of the electrolyte prepared in Preparation Example 1.

Comparative Example 1

A lithium secondary battery was manufactured in substantially the same manner as in Example 1, except that the electrolyte prepared in Comparative Preparation Example 1 was used instead of the electrolyte prepared in Preparation Example 1.

Evaluation Example 1

Resistance Test in High-temperature storage (at 60° C. for 30 days)

The lithium secondary batteries manufactured in Examples 1 to 6 and Comparative Example 1 were tested under the condition of 1 C/10 second discharge (SOC 100) at 25° C. to measure initial resistances (DCIR). Then, the lithium secondary batteries were stored at high temperature (60° C.), and then resistances thereof were measured to calculate resistance increase rates (%). The results thereof are shown in Table 1 and FIG. 2.

TABLE 1

| | Initial DCIR (mΩ) | DCIR (mΩ) after 30 days | DCIR increase rate (%) |
|---|---|---|---|
| Example 1 | 27.8 | 41.9 | 151 |
| Example 2 | 28.0 | 41.1 | 146 |
| Example 3 | 28.1 | 39.3 | 140 |
| Example 4 | 27.7 | 38.8 | 140 |
| Example 5 | 27.4 | 37.1 | 136 |
| Example 6 | 26.9 | 36.5 | 136 |
| Comparative Example 1 | 28.2 | 43.2 | 153 |

Figure 2:
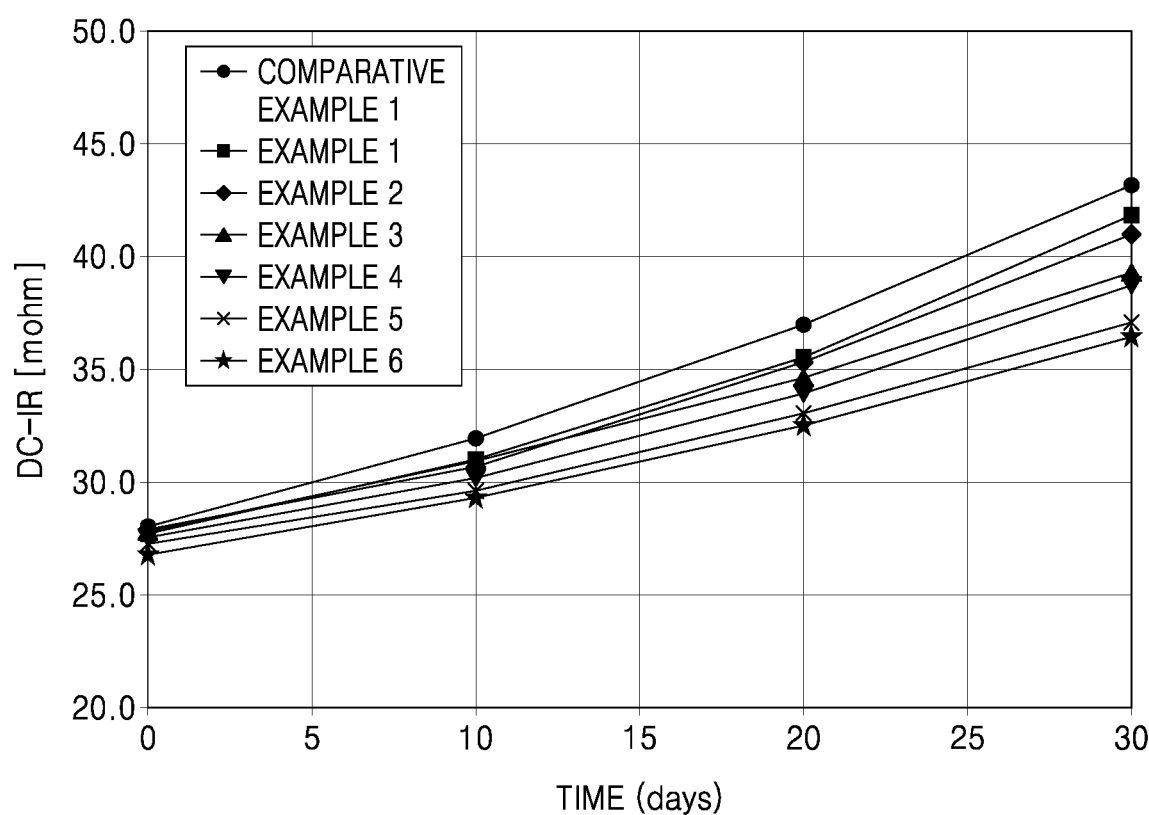
FIG. 2 is a graph comparing the high-temperature storage resistance characteristics of lithium secondary batteries prepared according to Examples 1 to 6 and Comparative Example 1.

As shown in Table 1 and FIG. 2, it can be seen that the high-temperature resistance increase rate of each of the lithium secondary batteries of Examples 1 to 6 is remarkably lower than that of the lithium secondary battery of Comparative Example 1 not including Compound 1 even when they were stored at high temperature for a long period of time. Although the present disclosure is not limited by any particular mechanism or theory, it is believed that this is because the —OPF$_2$ functional group of Compound 1 effectively suppresses or reduces the side reaction of LiPF$_6$.

According to an embodiment, when an electrolyte for a lithium secondary battery, including an additive containing a silicon compound having a new structure, is used, the high-temperature characteristics of the lithium secondary battery may be improved.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6.

Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that the embodiments described herein should be considered in a descriptive sense only and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and equivalents thereof.

What is claimed is:

1. An electrolyte for a lithium secondary battery, comprising:
   a lithium salt;
   a non-aqueous organic solvent; and
   an additive comprising a compound represented by Formula 1 below:

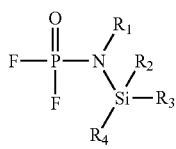
<Formula 1> wherein, in Formula 1,
   $R_1$ to $R_4$ are each independently a substituted or unsubstituted $C_1$-$C_{30}$ alkyl group or a substituted or unsubstituted $C_2$-$C_{30}$ alkenyl group, and
   a substituent of the substituted $C_1$-$C_{30}$ alkyl group or the substituted $C_2$-$C_{30}$ alkenyl group comprises at least one selected from a $C_1$-$C_{20}$ alkyl group, a $C_2$-$C_{20}$ alkenyl group, a $C_2$-$C_{20}$ alkynyl group, a $C_1$-$C_{20}$ alkoxy group, a halogen, a cyano group, a hydroxy group, and a nitro group.

2. The electrolyte of claim 1, wherein,
   a weight of the additive is in a range of about 0.1 wt % to about 10 wt % based on a total weight of the electrolyte.

3. The electrolyte of claim 1, wherein,
   a weight of the additive is in a range of about 0.1 wt % to about 5 wt % based on a total weight of the electrolyte.

4. The electrolyte of claim 1, wherein,
   the lithium salt comprises at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ ($0 \leq x \leq 20$, $0 \leq y \leq 20$), LiCl, LiI, lithium bis(oxalate) borate (LiBOB), and $LiPO_2F_2$.

5. The electrolyte of claim 1, wherein,
   the non-aqueous organic solvent comprises at least one selected from ethyl methyl carbonate (EMC), methyl propyl carbonate, ethyl propyl carbonate, dimethyl carbonate (DMC), diethyl carbonate (DEC), dipropyl carbonate, propylene carbonate (PC), ethylene carbonate (EC), fluoroethylene carbonate (FEC), vinylene carbonate (VC), vinylethylene carbonate (VEC), butylene carbonate, ethyl propionate, ethyl butyrate, dimethyl sulfoxide, dimethyl formamide, dimethylacetamide, gamma-valerolactone, gamma-butyrolactone, and tetrahydrofuran.

6. A lithium secondary battery, comprising:
   a cathode;
   an anode; and
   the electrolyte of claim 1.

7. The lithium secondary battery of claim 6, wherein,
   the anode comprises at least one selected from a lithium metal, a metal alloyable with lithium, a transition metal oxide, a non-transition metal oxide, and a carbon-based material.

8. The lithium secondary battery of claim 6, wherein,
   the cathode comprises a cathode active material having a layered structure.

9. The lithium secondary battery of claim 8, wherein,
   the cathode active material is represented by Formula 3:

$LiNi_{1-s}M'_sO_2$      <Formula 3> wherein, in Formula 3,
   M' is at least one selected from Co, Mn, Al, Cu, Fe, Mg, Cr, Zn, B, and Ga, and $0 < s \leq 0.99$ is satisfied.

10. The lithium secondary battery of claim 8, wherein,
    the cathode active material is represented by Formula 4:

$Li_t(Ni_{1-u-v}Co_uM''_v)O_2$      <Formula 4> wherein, in Formula 4,
    M" is Mn or Al, and $0.96 \leq t \leq 1.05$, $0 < u \leq 0.5$, and $0 < v \leq 0.5$ are satisfied.

* * * * *